United States Patent
Marco et al.

(10) Patent No.: US 10,601,719 B2
(45) Date of Patent: Mar. 24, 2020

(54) USER-EQUIPMENT-BASED QUALITY-OF-SERVICE ENFORCEMENT AND CONTROL SYSTEM AND METHOD FOR REAL-TIME TRAFFIC

(71) Applicant: Nvidia Corporation, Santa Clara, CA (US)

(72) Inventors: Olivier Marco, Santa Clara, CA (US); Niyas Nazar Sait, Santa Clara, CA (US); Luc Revardel, Santa Clara, CA (US); Jonathan Martin, Santa Clara, CA (US); Flavien Delorme, Santa Clara, CA (US); Neda Nikaein, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 721 days.

(21) Appl. No.: 14/848,687

(22) Filed: Sep. 9, 2015

(65) Prior Publication Data

US 2017/0070435 A1 Mar. 9, 2017

(51) Int. Cl.
*H04L 12/853* (2013.01)
*H04L 29/06* (2006.01)
*H04W 28/02* (2009.01)
*H04L 12/823* (2013.01)
*H04L 12/851* (2013.01)
H04L 12/26 (2006.01)
H04L 12/24 (2006.01)

(52) U.S. Cl.
CPC ...... *H04L 47/2416* (2013.01); *H04L 47/2441* (2013.01); *H04L 47/32* (2013.01); *H04L 65/80* (2013.01); *H04W 28/0247* (2013.01); *H04L 41/0893* (2013.01); *H04L 43/028* (2013.01); *H04L 43/08* (2013.01)

(58) Field of Classification Search
None
See application file for complete search history.

(56) References Cited

U.S. PATENT DOCUMENTS

| | | | | |
|---|---|---|---|---|
| 2011/0069635 A1* | 3/2011 | Low | | H04W 28/24 370/254 |
| 2014/0071888 A1* | 3/2014 | Khay-Ibbat | | H04W 76/028 370/328 |
| 2015/0257161 A1* | 9/2015 | Hsu | | H04W 72/0486 455/453 |
| 2016/0374104 A1* | 12/2016 | Watfa | | H04W 36/0011 |
| 2017/0041854 A1* | 2/2017 | Kim | | H04W 28/02 |

FOREIGN PATENT DOCUMENTS

WO   WO 2013137872 A1 *   9/2013   ............. H04W 8/18

* cited by examiner

*Primary Examiner* — Marcus Smith

(57) ABSTRACT

A system for enforcing quality of service and methods of configuring and enforcing quality of service (QoS). In one embodiment, the system includes: (1) a host configured to process a plurality of applications and (2) a modem coupled to the host and configured to interface with data networks and having a non-access stratum configured to prioritize real time data packets and selectively to discard data packets based on a defined criteria.

13 Claims, 4 Drawing Sheets

USER-EQUIPMENT-BASED QUALITY-OF-SERVICE ENFORCEMENT AND CONTROL SYSTEM AND METHOD FOR REAL-TIME TRAFFIC

TECHNICAL FIELD

This application is directed, in general, to network communications and, more specifically, to a system and method of providing user-equipment-based quality of service enforcement and control for real-time traffic.

BACKGROUND

Some software applications require priority handling in the network that is to bear the traffic they generate. Examples of software applications that often require priority handling are applications for making voice-over-Internet-Protocol (VoIP) calls or gaming applications, such as GRID, commercially provided by NVIDIA Corporation of Santa Clara, Calif. QoS (Quality of Service) is the mechanism that plays an important role in establishing traffic priority. QoS employs quantifiable metrics, such as packet loss rate, packet delay and average bitrate, to define priorities for certain services. While the priorities apply all the time, they are especially useful during times of high congestion.

In an Evolved Packet System (EPS), i.e. a combination of a Long-Term Evolution (LTE) Radio Access Network and an Evolved Packet Core (EPC) network, QoS is implemented between User Equipment (UE) and Packet Data Network (PDN) gateways and is applied to a set of "bearers" called EPS bearers. As those skilled in the pertinent art understand, a "bearer" is a virtual entity, namely a group of network configurations, including an EPC and a Radio Access Network (RAN) part, that together defines QoS for a subset of traffic. The RAN part of the EPS bearer is realized by a Data Radio Bearer (DRB).

Two types of bearer are currently defined in an EPS: a default EPS bearer and a dedicated EPS bearer. At least one default EPS bearer is automatically provided with each PDN connection in LTE, usually providing "best-effort" QoS. A dedicated EPS bearer is created exclusively by the network to accommodate traffic with specific QoS needs, compared to the QoS provided by the default bearer. In the following, only one PDN is considered for simplicity, however the extension to several PDNs is straightforward.

A traffic flow template (TFT) is a set of rules used to route traffic to the correct EPS bearer. A default EPS bearer need not have a TFT, but a dedicated bearer always has a TFT. A TFT for a dedicated EPS bearer allows the UE and the network to determine the bearer that should bear a particular IP packet. TFT rules are primarily based on IP packet source and destination addresses. However, other information may be included, such as protocol type or port number.

A request for a certain QoS may be either UE-initiated or network-initiated. In a network-initiated request, an application requests a specific QoS through application level signaling using a default EPS bearer to an Application Function (AF) entity. The AF entity then sends Service Description parameters to a Policy Charging Rules Function (PCRF) in terms of QoS requirements. In response, the PCRF derives Policy Control and Charging (PCC) Rules and send them to a Policy and Charging Enforcement Function (PCEF). The PCEF then triggers the creation of one or more dedicated EPS bearers as needed.

In a UE-initiated request, an application requests specific QoS from a modem in the UE. Standardized AT commands are available for 3GPP access. The UE then sends a Bearer Resource Request (BRR) including its QoS requirements. The PDN gateway then forwards the BRR request to the PCRF. If agreed, the PCRF derives PCC rules and sends them to the PCEF. The PCEF then triggers the creation of one or more dedicated EPS bearers as needed.

SUMMARY

One aspect provides a QoS enforcement and control system. In one embodiment, the system includes: (1) a host configured to process a plurality of applications and (2) a modem coupled to the host and configured to interface with data networks and having a non-access stratum configured to prioritize real time data packets and selectively to discard data packets based on a defined criteria.

Another aspect provides a method of configuring internal QoS (internal to the UE). In one embodiment, the method includes: (1) making a QoS request from a radio interface layer, (2) translating the QoS request into an AT command, (3) providing the AT command to an AT command interpreter, (4) translating the AT command into a QoS rule and (5) providing the QoS rule to an internal QoS controller.

Another aspect provides a method of enforcing internal QoS (again, internal to the UE). In one embodiment, the method includes: (1) identifying data packets internal to a non-access stratum of a modem, (2) associating a QoS policy to the data packets internal to the non-access stratum of a modem and (3) applying the QoS policy to the data packets internal to the non-access stratum of a modem.

BRIEF DESCRIPTION

Reference is now made to the following descriptions taken in conjunction with the accompanying drawings, in which.

DETAILED DESCRIPTION

Figure 1:
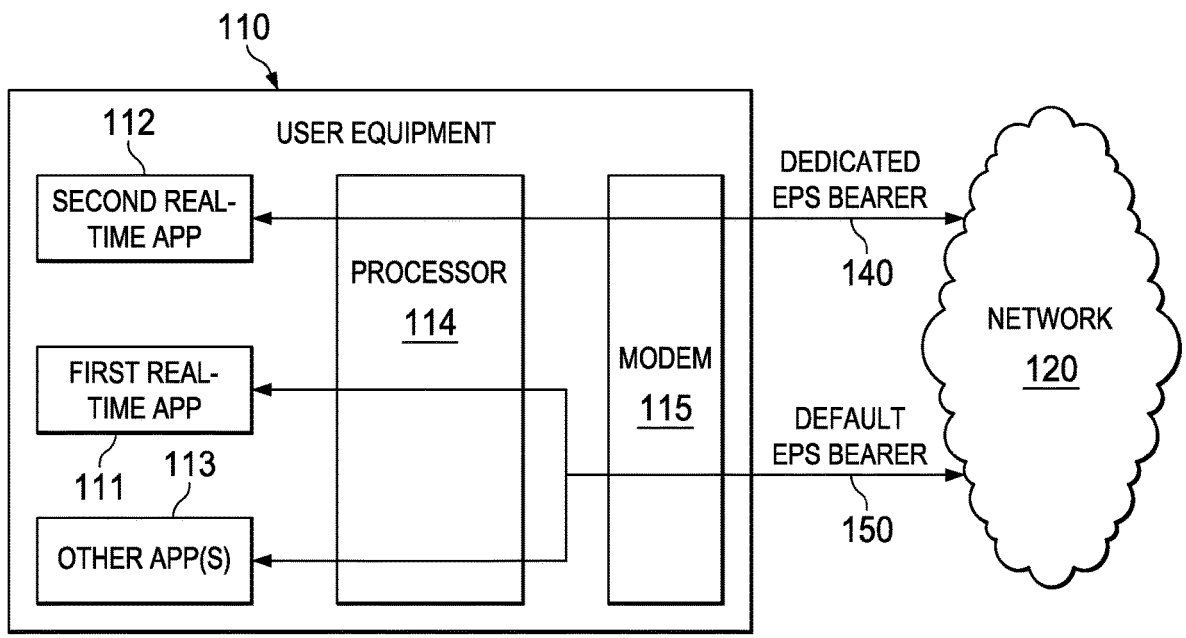
FIG. 1 is a diagram of one embodiment of UE configured to control and enforce QoS within a communications network.

As stated above, a request for a certain QoS may be either UE-initiated or network-initiated, and procedures exist for both UE-initiated or network-initiated requests. Unfortunately, a UE is not guaranteed to be granted a dedicated bearer providing the requested QoS. Moreover, even when a dedicated bearer is granted, the Access Stratum (AS) QoS request handling is not guaranteed to be effective.

As a matter of fact, network-initiated QoS is mostly used for operator-controlled services, such as Voice over LTE (VoLTE) and IP Multimedia Subsystem (IMS), or sponsored services. As a result, UE-initiated QoS requests are more likely to be rejected so priority can be given to the operator-controlled services. Consequently, increasing numbers of UE applications are relegated to sharing a default bearer and thus deprived of any mechanism to prioritize specific IP traffic. This is unfortunate, because real time traffic should, as a general rule, be prioritized over non-real time traffic.

In cases where a dedicated bearer with requested QoS parameters is granted by the network, QoS handling related to uplink prioritization may not always be effective. In fact, when the aggregate data rate of the different applications exceeds the physical data rate, and assuming no Packet Data Convergence Protocol (PDCP) discard timer is set by the network for a given bearer, the amount of memory available limits the system.

To illustrate this point, consider two dedicated traffic flows: one low priority User Datagram Protocol (UDP) uplink traffic flow at 3 Mbps and one high priority UDP uplink traffic flow at 3 Mbps. If the average maximum physical-layer throughput is lower than 6 Mbps, and the discard timer is not set, modem buffers will eventually fill up, causing an implicit flow control at the host interface side to shape the traffic. This kind of flow control does not apply Access Stratum (AS) QoS rules when discarding packets. Typically, both flows will be equally rate-shaped with the same throughput.

The only conventional way to address this issue is for the network to configure a PDCP discard timer for each dedicated bearer. Each PDCP discard timer is then linked to the time budget allowed for the given QoS profile. No need exists to keep a real-time packet if it has not been transmitted within a certain period of time. However, PDCP discard timers are often not used, especially in the case of non-GBR bearer.

On the other hand, for a given bearer, uplink packet transmission can be delayed due to internal modem buffering. Transmission by the UE inevitably requires some amount of buffering, because of conventional network-scheduled uplink transmission. In addition, protocols such as Transmission Control Protocol (TCP) can lead to increased buffering in the modem (known as "buffer bloat").

In LTE, UL data transmission is scheduled by the network. The UE first has to indicate to the network the amount of buffered data it needs to transmit. The network then sends scheduling assignments (uplink grants) in response, whereupon the UE can effectively transmit its data. This process requires a minimum buffering equal to one Time Transmit Interval worth of data corresponding to the physical throughput to avoid underrun. This minimum buffering typically is done in lower layers of the AS since the time constraints between reception of a grant and uplink transmission usually do not allow to perform much processing. The AS needs also to keep buffering data for the Automatic Repeat Request (ARQ) or Hybrid ARQ (HARQ) mechanism.

As those skilled in the pertinent art understand, TCP connections can lead to additional modem buffering. Indeed, as long as a TCP connection has data to transmit, TCP will aim to maximize its transmission window size ("flight size"). The transmission window size is limited by: the remote receive window size (sent from the remote TCP entity in order to ensure flow control), the congestion window size (regularly increased by the sender, but halved when a packet drop is detected, in order to ensure congestion control), and the maximum transmission window size (which is a transmitter buffer limitation).

TCP uses this mechanism to "fill the pipe," i.e. use the maximum possible bandwidth of the connection. However, when the flight size increases to values higher than the bandwidth delay product of the connection, the excess bytes in flight ends up buffered in the modem. This is unavoidable with TCP and leads to increased TCP round trip time (RTT), which can degrade performance and increase latency.

Moreover, to support a relatively high data rate, TCP maximum receive window size as well as maximum transmit buffer size are usually set to relatively large values. In addition, TCP congestion control typically does not occur in LTE, because ARQ and HARQ resolve most of the packet losses, particularly with a default bearer in Radio Link Control Acknowledged Mode (RLC AM). As a result, the transmission window size can reach very high values (e.g., up to 1 MB), leading to issue known as "buffer bloat." Usually, modem memory is unable to accommodate such large buffering. Thus, host interface flow control is undertaken. The increase in latency impacts not only the RTT of the TCP connection, but all the traffic sharing the same bearer, compromising QoS of real time services.

As a conclusion, the UE modem buffering should be large enough not to compromise uplink throughput but low enough not to increase uplink latency drastically. A conventional LTE system only relies on a DRB framework to ensure that uplink traffic can be prioritized over other buffered traffic. Inside the AS, no prioritization is possible within a given DRB.

It is realized herein that the UE should apply its own internal QoS enforcement policy per DRB. Once the bearer flow is identified, the UE could apply appropriate prioritization and discard rules to improve the application uplink latency within the bearer. The internal QoS enforcement relies on: flow control between NAS (Non-Access stratum) and AS, IP Flow prioritization at NAS level, selective packet discard to limit NAS buffering, internal QoS Control configuration based on AT commands.

It is further realized herein that flow control between the Non-Access Stratum (NAS) and the AS can be implemented on a per bearer basis. This flow control allows buffering to be limited (e.g., kept as low as possible) in the AS, while still avoiding underrun. Instead, excess data is buffered at NAS layer where it can be prioritized or discarded appropriately.

FIG. 1 is a diagram of one embodiment of UE configured to control and enforce QoS within a communications network. In this embodiment, dedicated EPS bearer 140 and a default EPS bearer 150 communicate data packets between a UE 110 and a network 120.

Internal to the UE 110 are multiple applications, including a first real-time app 111, a second real-time app 112, as well as other apps 113. The first real-time app 111, and the second real-time app 112, use data patterns that necessitate real time QoS. The second real-time app 112 was provided a dedicated EPS bearer channel 140. The first real-time app 111 was not provided a dedicated EPS bearer channel. The first real-time app 111 and the other apps 113, which may or may not use data patterns that necessitate real-time QoS, share a default EPS bearer channel. The first real-time app 111, the second real-time app 112, as well as any other app(s) 113, execute on the UE 110, via a processor 114. The processor 114 executes the code required to implement an app.

Additionally, the UE 110 includes a modem 115 configured to receive data prepared for transmission from the processor 114. The modem 115 is specifically configured to prioritize packets and transmit the packets into the network 120.

Figure 2:
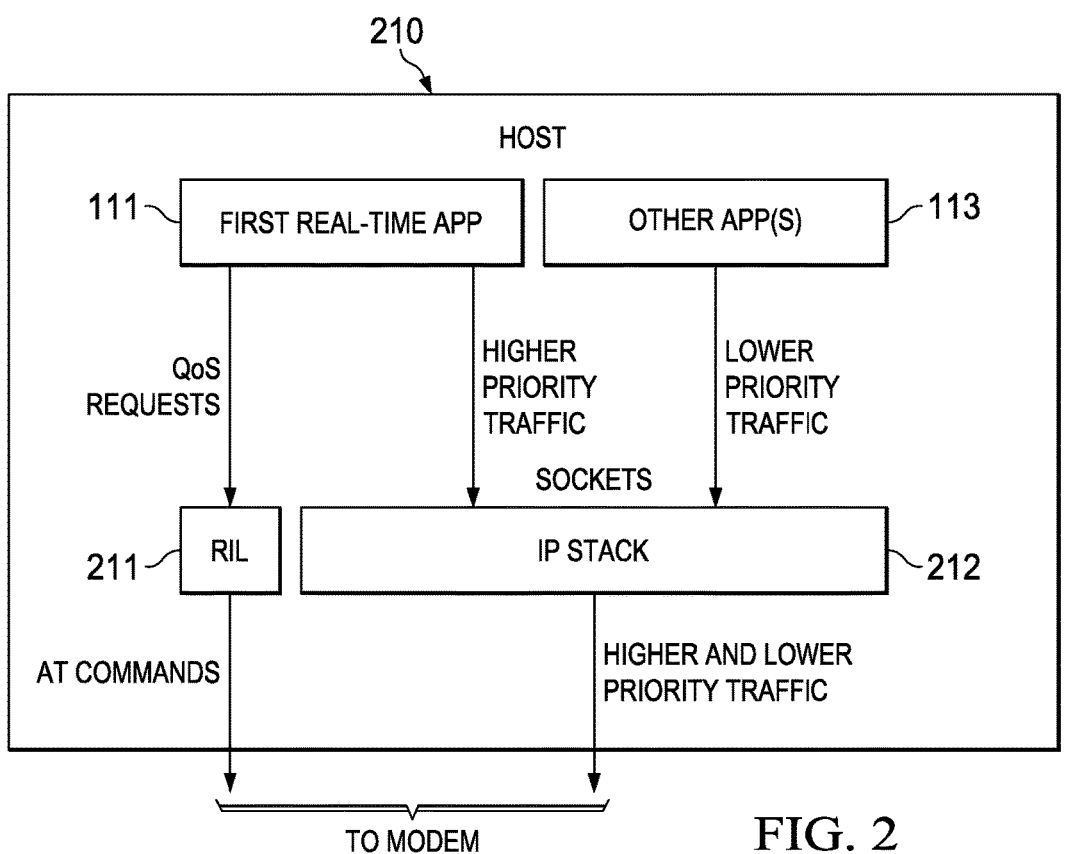
FIG. 2 is a diagram of one embodiment of a host of the UE of FIG. 1 configured to request QoS and prioritize user application packets.

FIG. 2 is a diagram of one embodiment of a host of the UE of FIG. 1 configured to request specific QoS aiming to prioritize user application packets. In this embodiment, the host 210 is configured to execute code that implements the first real-time app 111, as well as the one or more other apps 113. The real-time nature of the first real-time app 111 necessitates higher priority traffic as opposed to the other app(s) 113, which require only lower priority traffic. In the following, only two priority levels are considered for the sake of simplicity, however the extension to more than two priority levels is straightforward.

Both the higher priority traffic and the lower priority traffic are pushed on to an IP stack 212. The IP stack 212 then provides all application traffic, both the higher priority traffic of the first real-time app 111 as well as the lower priority traffic of the other apps 113 to a modem (illustrated in FIG. 3). The first real-time app 111 makes QoS requests through a Radio Interface Layer (RIL) 211. The RIL 211 is configured to convert the QoS requests into AT commands, which are then passed to the modem.

Figure 3:
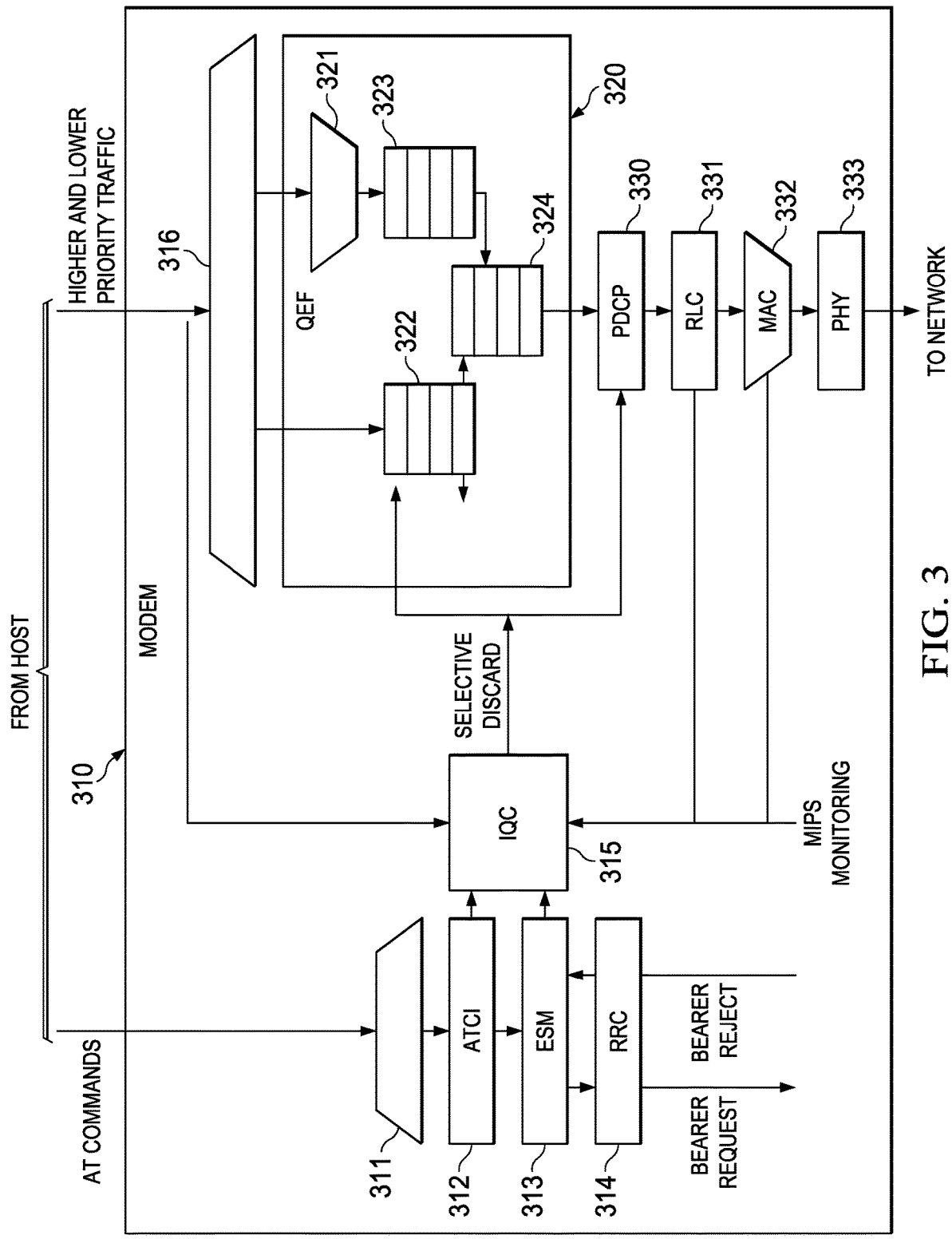
FIG. 3 is a diagram of one embodiment of the modem of the UE of FIG. 1 configured to enforce QoS, prioritize packet queuing and transmit packets.

FIG. 3 is a diagram of one embodiment of the modem of the UE of FIG. 1 configured to enforce QoS, prioritize packet queuing and transmit packets. The QoS request messages initiated by real-time applications are queue into a buffer 311. Subsequently, QoS requests are handled in the NAS by an AT command interpreter (ATCI) 312. The ATCI 312 then initializes a protocol transaction using an EPS session management (ESM) block 313 to request the establishment of a dedicated EPS bearer. The request message is propagated through a Radio Resource Control (RRC) block 314 in the AS, and then is transmitted into the network (120 of FIG. 1).

The network response is handled by the RRC block 314. The network may accept or reject the bearer request. In the illustrated embodiment, the network rejects the bearer request, meaning both the higher priority traffic of the first real-time app 111 as well as the lower priority traffic of the other apps 113 will share the same default bearer. The network response flows through the RRC block 314 and back to the ESM block 313. The ESM block 313 is configured to provide the bearer information into the internal QoS Controller (IQC) 315. The IQC will perform configuration of other blocks in order to realize internal prioritization of the higher priority traffic over lower priority traffic within the same bearer.

In the illustrated embodiment, the IQC 315 can accept, but is not limited to, inputs including configuration details from AT commands (standardized or proprietary) from the ATCI 312, bearer information (such as traffic flow templates, or TFTs, and QoS parameters) from the ESM 313, flow control information from the AS (such as RLC buffer occupancy values, UL grant values) and from the host interface, and MIPS monitoring.

The IQC 315 can provide output including, not limited to, rules sent to a QoS Enforcement Function (QEF) 320 (such as TFTs or Deep Packet Inspection templates, QoS parameters), rules sent to the AS, and scheduling rules sent to the QEF 320 and Packet Data Convergence Protocol (PDCP) block 330.

In the illustrated embodiment, the QEF 320 is further configured to provide functionality for IP flow identification. In various embodiments, the IP flow identification includes, but is not limited to, TFT packet filtering and Deep Packet Inspection (DPI). The QEF 320 is further configured to provide functionality for IP flow and bearer prioritization, and selective packet discard.

The QEF 320 is configured to receive data packets queue from the host in a buffer 316. In the illustrated embodiment, internal to the QEF 320, packets undergo IP flow identification, before being queued in one of several queues. Higher priority traffic matching a template 321 is queued in a high priority packet queue 323. Lower priority traffic not matching the template 321 is queued in a low priority packet queue 322. Obviously more queues can be considered in case a finer priority granularity is needed.

In the illustrated embodiment, the QEF 320 is further configured to implement a flow control between NAS and AS. In one embodiment, packets remain queued into NAS priority queues till the AS requests a given amount of data. The request may be triggered on a Time Transmit Interval (TTI) basis. The requested amount of data may be set such that a minimum amount of data is maintained available for transmission at lower layers. Packets up to the requested data amount are then dequeued from the NAS priority queues, taking the priorities into account, into a transmit queue 324. The transmit queue 324 is the resultant combination of the low priority packet queue 322 and the high priority packet queue 323 after prioritization has been performed. This allows for the insertion of higher priority packets before lower priority packets in the transmit queue 324. The transmit queue 324 is then pushed to the PCDP 330.

The QEF 320 is further configured to discard packets to limit NAS buffering, based on selective discard rules provided from the IQC 315. When AS throughput is lower than incoming data throughput, NAS buffering may increase till host interface flow control is triggered. As illustrated above, such host interface flow control may not be desirable as it is typically not aware of modem (AS) QoS settings. Typically, it may lead to the discard of higher priority packets. In one embodiment, before host interface flow control mechanism is triggered, a selective packet discard is performed within NAS, based on a low available memory threshold. The selective discard rules may typically request lower priority packets to be discarded before any higher priority packet is discarded. The selective discard allows to keep internal modem QoS control effective by preventing host interface flow control, which is agnostic to modem QoS settings.

Figure 4:
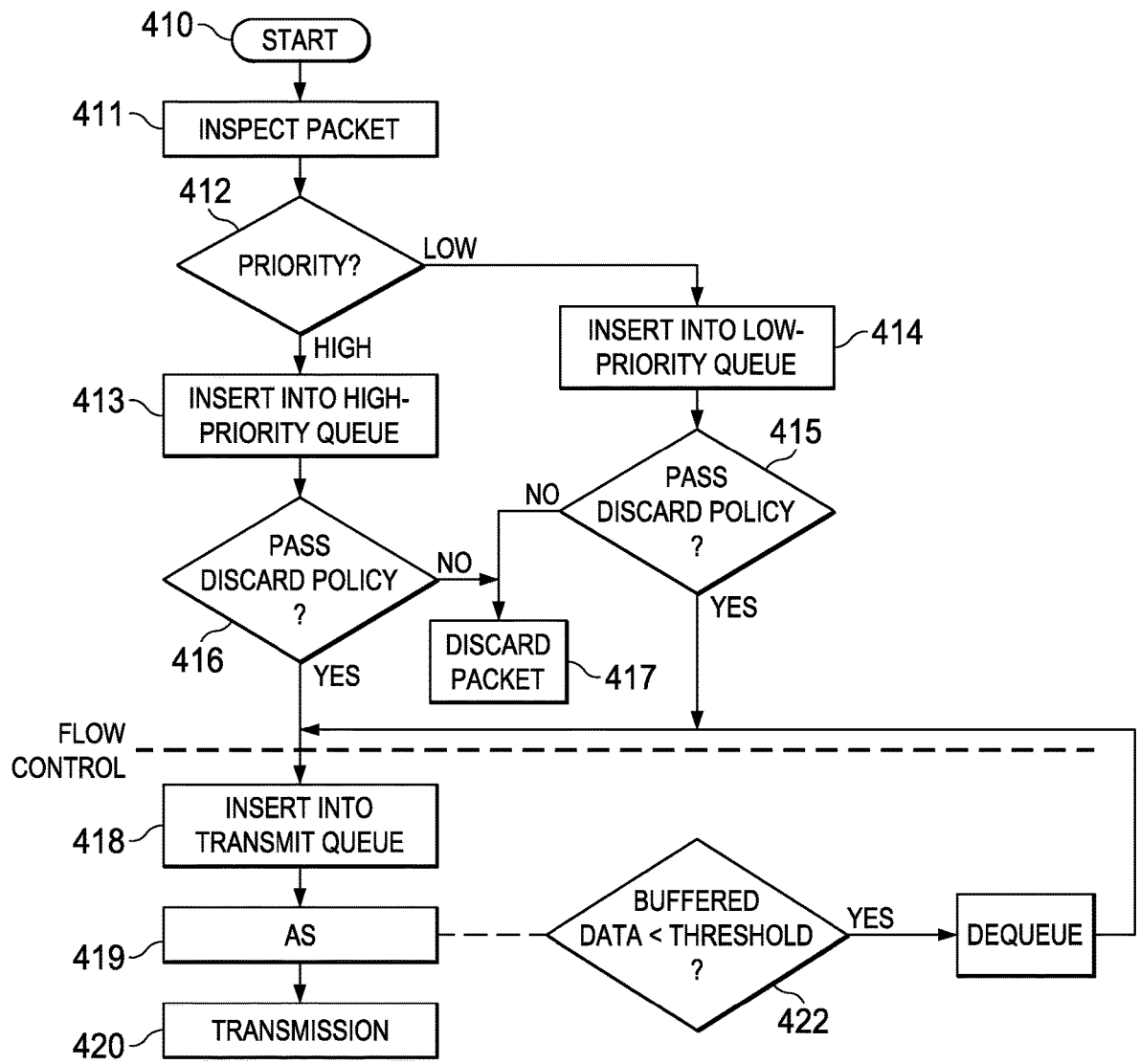
FIG. 4 is a flow diagram of one embodiment of a method for processing data packets passing through a QoS enforcement function.

FIG. 4 is a flow diagram of one embodiment of a method of processing of data packets passing through a QoS enforcement function. The method begins in a start step 410.

Upon first receiving a data packet, a packet inspection is performed in a step 411. In one embodiment, the packet inspection is standards-based. This includes the case where an application requests a dedicated bearer through standards-based commands, but the requested bearer is not granted by the network. In an alternative embodiment, the packet inspection is a deep packet inspection, based on proprietary rules. The purpose of the packet inspection is to determine the priority level of the packet. A decisional step 412 is then performed based on the outcome of the packet inspection. Higher priority packets are inserted into a dedicated high priority queue in a step 413. Lower priority packets are inserted in a dedicated lower priority packet queue in a step 414. Lower and higher priority packets are evaluated against enforcement policies for discard in decisional steps 415 and 416. If one packet does not meet the policy requirement, the packet is discarded in a step 417.

Subsequently, as data is transmitted by lower layers, AS buffering falls below a threshold and a dequeue is triggered by AS at step 422. The dequeue requests a given amount of data to be dequeued (taken out of the queue) into the transmit queue. Higher priority packets are placed in the transmit queue and, if enough space exists in the transmit queue, lower priority packets are placed in the transmit queue up to the dequeue amount in a step 418.

Once the transmit queue is populated, all packets are sent for transmission to AS in a step 419. The packets are transmitted into the network at step 420. The buffered data available for immediate transmission to the network is monitored and may trigger a dequeue request whenever it falls below a configured threshold at step 422.

Figure 5:
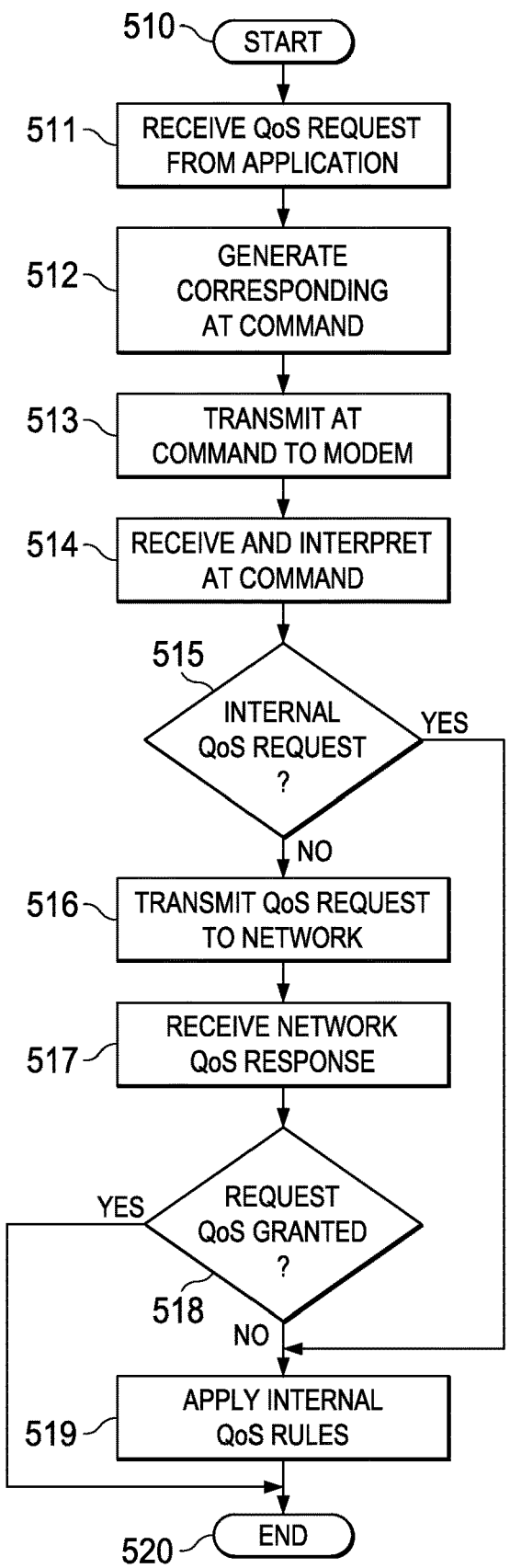
FIG. 5 is a flow diagram of one embodiment of a method of configuring QoS through an internal QoS controller.

FIG. 5 is a flow diagram of one embodiment of a method of configuring QoS through an internal QoS controller. The method begins in a start step 510. For QoS to be set up properly, an application requests QoS in a step 511. The QoS request is translated to a custom AT command in a step 512. The AT command is the output from the host to the modem in a step 513. The AT command is interpreted into a usable QoS request in a step 514. After decoding, the QoS request is evaluated to determine if it is an internal QoS request or a network QoS request in a decisional step 515. If the request is for internal QoS, the discard rules and policies are applied to the QoS enforcement function in a step 518.

If the request is for network-based QoS, the request is transmitted to the network for appropriate handling in a step 516. Upon receipt of a network QoS response in a step 517, it is determined whether the network granted the requested QoS in a decisional step 518. if the network granted the requested QoS, requested rules and policies are applied to the internal QoS enforcement function in the step 519. The method ends in an end step 520.

Those skilled in the art to which this application relates will appreciate that other and further additions, deletions, substitutions and modifications may be made to the described embodiments.

What is claimed is:

1. A method of configuring internal quality of service, comprising:
    making a quality of service request from a radio interface layer;
    translating said quality of service request into an AT command;
    providing said AT command to an AT command interpreter;
    translating said AT command into a quality of service rule; and
    providing said quality of service rule to an internal quality of service controller.

2. The method as recited in claim 1 wherein said AT command is a proprietary command.

3. The method as recited in claim 1 wherein said AT command is a standard-based AT command, and wherein said internal quality of service is configured as a fallback if a requested standard based QoS is not granted.

4. The method as recited in claim 1 wherein said quality of service rules comprise discard selection criteria.

5. The method as recited in claim 1 wherein said quality of service rules further comprise prioritization criteria.

6. The method as recited in claim 1 wherein said quality of service rules further comprise proprietary deep inspection patterns to identify traffic flows.

7. A method of enforcing internal quality of service, comprising:
    identifying data packets internal to a non-access stratum of a modem;
    associating a quality of service policy to said data packets internal to said non-access stratum of a modem; and
    applying said quality of service policy to said data packets internal to said non-access stratum of a modem.

8. The method as recited in claim 7 wherein said identifying said data packets is enabled by an existing standards-based framework.

9. The method as recited in claim 7 wherein said identification of said data packets is enabled by deep packet inspection.

10. The method as recited in claim 7 further comprising receiving an AT command; and
    basing said quality of service policy on at least one quality of service rule determined by said AT command.

11. The method as recited in claim 7 wherein said applying of said quality of service policy to said data packets is enabled by a custom configuration.

12. The method as recited in claim 7 wherein said applying comprises:
    limiting buffered data within an access stratum of said modem while avoiding underrun; and
    prioritizing packets for transmission within said non-access stratum based on quality of service policy.

13. The method as recited in claim 7 wherein said applying is carried out on a data bearer basis.

* * * * *